United States Patent
Kasterstein et al.

(10) Patent No.: US 9,235,693 B2
(45) Date of Patent: Jan. 12, 2016

(54) SYSTEM AND METHODS THEREOF FOR TRACKING AND PREVENTING EXECUTION OF RESTRICTED APPLICATIONS

(71) Applicant: DOAT MEDIA LTD., Tel-Aviv (IL)

(72) Inventors: Rami Kasterstein, Givataim (IL); Amihay Ben-David, London (GB); Joey Joseph Simhon, Ramat-Gan (IL)

(73) Assignee: Doat Media Ltd., Tel Aviv (IL)

( * ) Notice: Subject to any disclaimer, the term of this patent is extended or adjusted under 35 U.S.C. 154(b) by 0 days.

(21) Appl. No.: 14/050,573

(22) Filed: Oct. 10, 2013

(65) Prior Publication Data

US 2014/0165212 A1    Jun. 12, 2014

Related U.S. Application Data

(60) Provisional application No. 61/733,911, filed on Dec. 6, 2012.

(51) Int. Cl.
    *G06F 21/31* (2013.01)
    *G06F 21/12* (2013.01)

(52) U.S. Cl.
    CPC ............. *G06F 21/121* (2013.01); *G06F 21/31* (2013.01); *G06F 2221/2111* (2013.01); *G06F 2221/2149* (2013.01)

(58) Field of Classification Search
    CPC .................. G06F 21/31; G06F 21/121; G06F 2221/2111; G06F 2221/2149
    See application file for complete search history.

(56) References Cited

U.S. PATENT DOCUMENTS

| | | | |
|---|---|---|---|
| 5,911,043 A * | 6/1999 | Duffy et al. ................... 709/203 |
| 6,727,923 B1 | 4/2004 | McInerney | |
| 7,065,550 B2 * | 6/2006 | Raghunandan ... G06F 17/30867 705/14.54 |
| 7,302,272 B2 * | 11/2007 | Ackley ........................ 455/466 |
| 7,376,594 B2 | 5/2008 | Nigrin | |
| 7,483,908 B2 | 1/2009 | Seliger et al. | |
| 7,565,383 B2 | 7/2009 | Gebhart et al. | |
| 7,567,904 B2 | 7/2009 | Layher | |
| 7,599,925 B2 | 10/2009 | Larson et al. | |
| 7,797,298 B2 | 9/2010 | Sareen et al. | |
| 7,836,006 B2 * | 11/2010 | Kobayashi ............. G06Q 30/02 706/45 |
| 7,934,253 B2 | 4/2011 | Overcash et al. | |
| 7,958,141 B2 | 6/2011 | Sundaresan et al. | |
| 8,032,666 B2 | 10/2011 | Srinivansan et al. | |
| 8,103,967 B2 | 1/2012 | Lazier et al. | |
| 8,181,102 B2 | 5/2012 | Schroeder | |
| 8,312,484 B1 * | 11/2012 | McCarty et al. ................. 725/28 |
| 8,571,538 B2 * | 10/2013 | Sprigg et al. .................. 455/419 |
| 8,718,633 B2 * | 5/2014 | Sprigg et al. .................. 455/419 |
| 2004/0158871 A1 * | 8/2004 | Jacobson ................ G07F 7/069 725/115 |
| 2004/0186989 A1 | 9/2004 | Clapper | |
| 2005/0076367 A1 * | 4/2005 | Johnson et al. ................. 725/58 |
| 2005/0102407 A1 * | 5/2005 | Clapper ........................ 709/228 |

(Continued)

*Primary Examiner* — Kaveh Abrishamkar
*Assistant Examiner* — James J Wilcox
(74) *Attorney, Agent, or Firm* — M&B IP Analysts, LLC

(57) ABSTRACT

A system and method for tracking and preventing an execution of an application on a user device are provided. The method comprises receiving a request to determine if an application is a restricted application for a user of the user device; receiving at least one context parameter respective of the application; receiving at least one variable related the user of the user device; determining whether the application is a restricted application based on the analysis of the at least one context parameter and the at least one variable parameter; and disabling an access of the user to contents of the application if the application is determined to be restricted.

15 Claims, 2 Drawing Sheets

(56) References Cited

U.S. PATENT DOCUMENTS

| | | | |
|---|---|---|---|
| 2006/0053469 A1 | 3/2006 | Newton et al. | |
| 2006/0184792 A1 | 8/2006 | Berlin | |
| 2006/0206803 A1 | 9/2006 | Smith | |
| 2007/0112739 A1 | 5/2007 | Burns et al. | |
| 2007/0174900 A1* | 7/2007 | Marueli et al. | 726/4 |
| 2007/0204039 A1* | 8/2007 | Inamdar | 709/225 |
| 2008/0256643 A1 | 10/2008 | Jones et al. | |
| 2010/0042912 A1* | 2/2010 | Whitaker | 715/212 |
| 2010/0094854 A1 | 4/2010 | Rouhani-Kalleh | |
| 2010/0169980 A1* | 7/2010 | Kim | G06T 1/0021 726/27 |
| 2011/0078767 A1* | 3/2011 | Cai et al. | 726/4 |
| 2011/0131205 A1 | 6/2011 | Iyer et al. | |
| 2011/0252332 A1 | 10/2011 | Lee et al. | |
| 2011/0320274 A1* | 12/2011 | Patil | G06Q 30/0251 705/14.49 |
| 2012/0110515 A1 | 5/2012 | Abramoff et al. | |
| 2014/0149856 A1* | 5/2014 | Fong | G06Q 50/01 715/254 |
| 2014/0282884 A1* | 9/2014 | Bao | G06F 21/31 726/4 |
| 2014/0289417 A1* | 9/2014 | Chan | H04L 47/70 709/226 |
| 2015/0039406 A1* | 2/2015 | Dubey | G06Q 30/0242 705/14.4 |
| 2015/0046515 A1* | 2/2015 | Pei | H04L 67/36 709/203 |
| 2015/0095154 A1* | 4/2015 | Kannan | G06Q 30/0257 705/14.55 |
| 2015/0112962 A1* | 4/2015 | Simhon | G06F 17/30864 707/709 |
| 2015/0213465 A1* | 7/2015 | Noyes | G06Q 30/0201 705/7.35 |

\* cited by examiner

SYSTEM AND METHODS THEREOF FOR TRACKING AND PREVENTING EXECUTION OF RESTRICTED APPLICATIONS

CROSS REFERENCE TO RELATED APPLICATIONS

This application claims priority from U.S. provisional application No. 61/733,911 filed on Dec. 6, 2012, the contents of which are incorporated herein by reference.

TECHNICAL FIELD

The present invention generally relates to execution and display of mobile applications on a user device, and more specifically to techniques for preventing the display of restricted or inappropriate mobile applications on the user device.

BACKGROUND

The use of mobile devices and especially smart phones has significantly increased. Such mobile devices have become in many cases a primary replacement for other computing devices, allowing access to data by the mobile devices to a variety of application programs. Application programs, also known as applications, are designed to help a user of a mobile device to perform specific tasks. Such applications may be bundled with the mobile device and its system software. There are primarily two different mobile applications, a native application and a web application. Typically, a native application is downloadable from a central repository, for example, the AppStore®. Once downloaded to the mobile device, the application is locally installed on the device and then can be executed. A web application is executed on a remote server and can be accessed from the mobile device without any installation thereon.

To limit certain users, e.g., children, from accessing inappropriate contents and in particular, specific applications, mobile devices such as smart phones, are equipped with a built-in parental control mechanism. For example, the iPhone® operating system, iOS®, provides age restrictions for blocking age-inappropriate applications from being downloaded to the device. Thus, such an operation system, and other similar control mechanisms enable parents to restrict already installed applications that their child can access.

However, the wide and easy accessibility of such applications makes it very difficult for a parent to supervise the content viewed through a child's mobile device. Furthermore, in most cases, such restrictions can be overridden by the users, as they are merely protected by a passcode. For example, if a user (e.g., a child) knows the passcode to open the mobile phone, the user can change setting of the parental control mechanism. In addition, teenagers typically own their mobile phones, thus setting an access or parental control by configuring the device may not be an option for such a group of users.

Furthermore, parental and access control mechanisms are limited to the download, installation, and/or execution of already installed applications on the mobile device. Thus, for web applications accessed through mobile devices from remote servers, the built-in control mechanisms may not be applicable, because such applications are not downloaded and installed on the mobile device.

It would be therefore advantageous to provide an efficient access parental control solution that overcomes the limitations of the prior art solutions.

SUMMARY

Certain exemplary embodiments disclosed herein include a method for tracking and preventing an execution of an application on a user device. The method comprises receiving a request to determine if an application is a restricted application for a user of the user device; receiving at least one context parameter respective of the application; receiving at least one variable related the user of the user device; determining whether the application is a restricted application based on the analysis of the at least one context parameter and the at least one variable parameter; and disabling an access of the user to contents of the application if the application is determined to be restricted.

Certain exemplary embodiments disclosed herein include a system for tracking and preventing an execution of an application on a user device. The system comprises an interface to a network to communicate with at least the user device and a plurality of systems configured to provide variables related to the user capable of receiving a request to execute an application on the user device; a processor; and a memory coupled to the processor configured to store a plurality of instructions that when executed configure the system to: receive a request to determine if an application is a restricted application for a user of the user device; receive at least one context parameter respective of the application; receive at least one variable related to the user of the user device; determine whether the application is a restricted application based on the analysis of the at least one context parameter and the at least one variable parameter; and disable an access of the user to contents of the application if the application is determined to be restricted.

BRIEF DESCRIPTION OF THE DRAWINGS

The subject matter disclosed herein is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION

Figure 1:
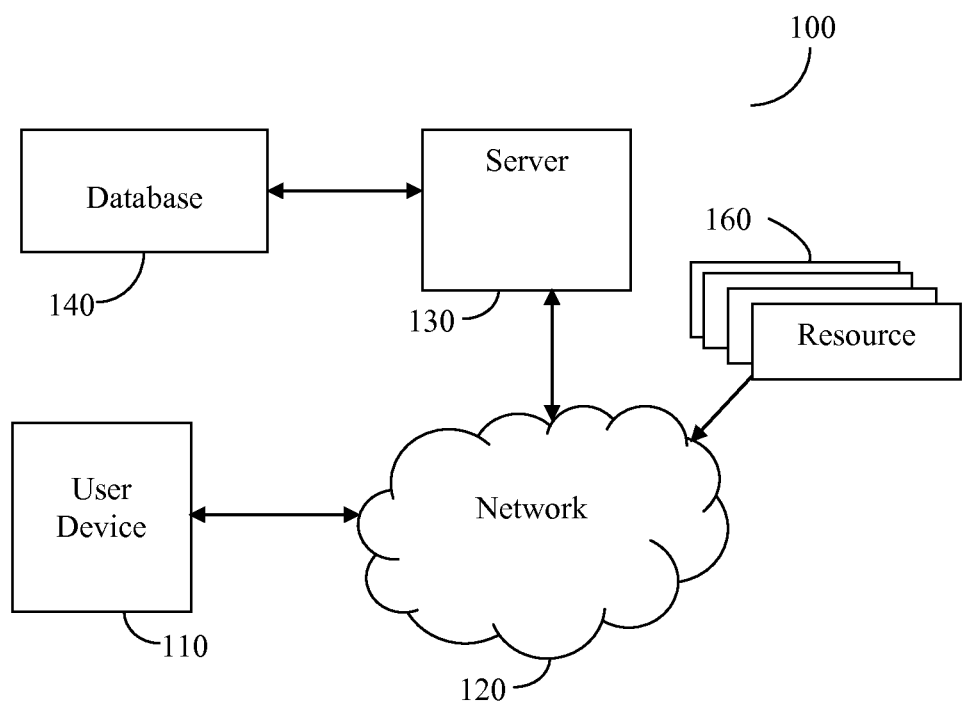
FIG. 1 is a schematic diagram of a network system utilized to describe the various disclosed embodiments.

The embodiments disclosed herein are only examples of the many possible advantageous uses and implementations of the innovative teachings presented herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

According to certain exemplary embodiments, a system and method for blocking access to or filtering restricted applications are provided. The system, according to one exemplary embodiment, is configured to receive a request to determine if an application requested to be displayed or executed over a user device is a restricted (or forbidden) application. The application may be a native application or a web application. Typically, a native application is downloadable from a central repository, for example, the AppStore®. Once downloaded to the mobile device, the application is locally installed on the device and then can be executed. A web application is executed on a remote server and can be accessed from the mobile device without any installation thereon.

According to the exemplary embodiment, a context parameter respective of the application and at least one variable, personal and/or environmental related to the user, are also received. Based on the analysis of the context parameter and the at least one variable, a determination is made if the application is restricted. The various embodiments are discussed in detail below.

FIG. 1 shows an exemplary and non-limiting schematic diagram of a network system 100 utilized to describe the various disclosed embodiments. A user device 110 such as but not limited to, a tablet computer, a smart phone, a mobile device, a mobile phone and the like communicates with a network 120. The network 120 may be wired, wireless, cellular, a local area network (LAN), a wide area network (WAN), a metro area network (MAN), the internet, the world-wide web (WWW), the like, and any combination thereof.

A server 130 is configured to receive a request to execute an application, native or web-based, on a user device 110. The server 130 is also configured to receive one more variables, personal or environmental, related to the user of the user device 110. An environmental variable may include, but is not limited to, search history, time of day, social friends, location, motion information, weather information, and more, as explained in greater detail in co-pending patent application Ser. No. 13/712,563 entitled "METHOD FOR DYNAMICALLY DISPLAYING A PERSONALIZED HOME SCREEN ON A DEVICE" filed on Dec. 12, 2012, assigned to the common assignee, the content of which is hereby incorporated by reference for all that it contains.

The environmental variables may be received from external sources (not shown) connected to the server 130 and/or the user device 110. The external source may be, for example, a web server, a database, and the like. For example, location information can be received by a GPS in the user device 110, while social friends may be received from a database of a social media website. A personal variable may include, but is not limited to, the profile of the user, demographic information related to the user, and so on. Such information may be stored in a database 140. The server 130 is further configured to receive at least a context parameter related to the application. The context parameter may include blocking ratings, age brackets, and metadata associated with an application, such as an application's name, category, description, and so on. In another embodiment, the identification of the context parameter may also be made by an agent (not shown) installed on the user device 110.

The server 130 is configured to provide a user of the user device 110 with one or more applications matching an input query provided by the user and or more of the context parameter, the user intent, a personal variable, and an environmental variable. The server 130 is configured to display over the user device 110 an icon respective of each application. When the user wishes to execute one of the applications returned by the search results (e.g., by tapping on the respective icon), the server 130 is configured to establish a connection link between the client device and a resource responsible for executing the application, e.g., one of the resources 160. As a result, a direct interaction is enabled between the application's resource 160 and the device 110 allowing transfer of contents generated by the application's resource to the display on the device 110. An application resource may be, for example, an application server, a search engine, a web server, a content server, and the like.

One implementation for searching applications and providing communication with the applications' resources as discussed herein can be found in a co-pending patent application Ser. No. 13/156,999 filed on Jun. 9, 2011, assigned to the common assignee, the content of which is hereby incorporated by reference for all that it contains.

Alternatively or collectively, the server 130 is also configured to search and "push" applications to a designated folder in the device 110. This includes identifying at least one folder on the device 110, searching for applications that can be added to the folder respective of at least a context parameter, generating an icon respective of each application found by the search, and displaying each icon respective of each application in the folder. The applications that can be included in the designated folder may be native applications and/or web applications. One implementation for searching and displaying applications in a designated folder as discussed herein can be found in a co-pending patent application Ser. No. 13/751,794, filed on Jan. 28, 2013, assigned to the common assignee and the content of which is hereby incorporated by reference for all that it contains.

According to the disclosed embodiments, the server 130 is configured to block access to restricted applications returned responsive of the search or the designation of the folder. In one embodiment, the server 130 is also configured to filter the search results in such a way that restricted applications (or icons thereof) will not be returned to the user device 110.

The filtering and/or blocking of restricted applications is performed based on the received variable related to the user of the device 110 and the context parameter related to each application. The variable may be a personal variable, an environmental variable, or both. In one embodiment, in order to block an access to an application, the server 130 does not establish a communication link with the application resource 160, if the application is determined to be inappropriate (i.e., restricted) to a user of the device 110. In order to filter a restricted application, the server 130 does not generate and display an icon respective of the application in the designated folder.

According to an embodiment, in order to determine that an application (accessed by the user and found through the search) is a restricted application, the server 130 is configured to analyze the received context parameter to determine the age bracket of the application, i.e., to which age group the application content is appropriate. This can be performed by correlating any of the following details, such as blocking ratings, age brackets, applications' descriptions and category. In one embodiment, the database 140 maintains a preconfigured list of applications and their respective age brackets. Thus, based on the application name which may be part of the context parameter, the age bracket of the application can be obtained.

The server 130 is further configured to analyze the at least one received variable to determine an age group of a user of the user device 110. This age group information may be derived from searching for a specific detail identifying the user's age in the received variable, for example, in a user profile, a social media's account, etc. In another embodiment, the analysis of the variables may include correlating one or more of the received variables to one or more predefined sets of rules. A set of rules defines a behavior or an attribute observed for a certain age group. For example, a location attribute of an elementary school indicates an age group of 6-12. Another non-limiting set of rules defines that a user who interacts with the user device 110 very frequently (e.g., every 5 minutes) indicates that the user is a teenager, e.g., in the age group between 13 and 17. Therefore, correlation between the received variables and the predefined sets of rules can determine the user's age group.

Based on the determined age group of the user and the age bracket of the application, the server 130 is configured to decide whether or not the application is a prohibited application. That is, if the age group of the user is not within the age bracket of the application, then the server 130 blocks or filters any access to the application.

As a non-limiting example, the server 130 receives a request to access an application on the user device 110. The application, in this example, is a web application returned through a search of the server 130. The server 130 receives by a GPS in the user device 110, an environment variable indicating that the user is located at the Booker T. Washington Middle School. The server 130 further receives a context parameter indicating that the application is a game which contains scenes of violence. Based on the analysis of the environmental variable it is determined that the age group of the user is 12-14 years old. Based on the analysis of the context parameter it is determined that the age bracket of the application is 17 years-old and older. Respective thereto the application is determined as restricted.

Figure 2:
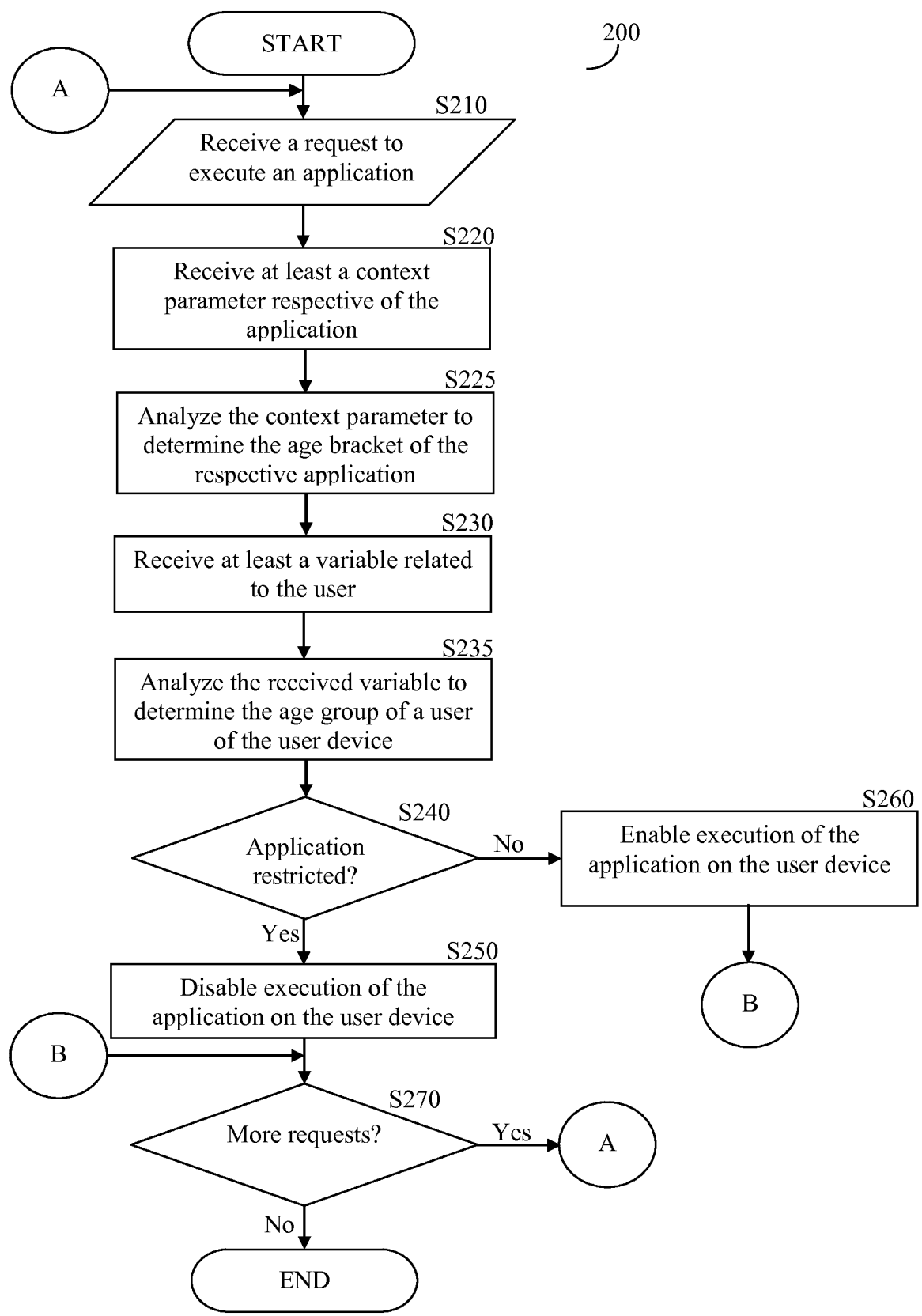
FIG. 2 is a flowchart illustrating a method for tracking and preventing execution of restricted applications on a device in accordance with an embodiment.

FIG. 2 depicts an exemplary and non-limiting flowchart 200 of a method for tracking and preventing execution of restricted applications on a device according to one embodiment. In S210, a request to execute an application on a device, for example, the user device 110 is received. The application may be a native application installed on the user device 110 or a web application. The application may be returned by the server 130 in response to a search request or designation of a folder in the device 110 as discussed in detail above.

In S220, at least one context parameter respective of the application is identified. Such context parameter may be, for example, the name of the application, the category of the application, blocking ratings or age bracket assigned to the application, and so on. The context parameter may be identified based on the application metadata. The context parameter can be derived from regulations extracted from web sources for applications such as, for example, the App Store® terms and conditions. In S225, the context parameter is analyzed to determine the age bracket of the respective application. Various embodiments for performing S225 are discussed above.

In S230, at least one variable related to the user of the user device 110 is received at the server 130. Such a variable may be an environmental variable and/or a personal variable. An environmental variable may be, for example and not by way of limitation, the location of the user device 110, the device's rate of motion, the time of day, how often the device is used by the user, and so on.

A personal variable is related to the user and may include, but is not limited to, a user profile, demographic information, user's preferences, and so on. Such a personal variable may be retrieved or received from systems and databases that generate and/or maintain the variables.

In S235, the received variable(s) is analyzed to determine the age group of a user of the user device. Various embodiments for performing S235 are discussed above. It should be noted that the order for carrying out S220, S230 is not limited to the order described herein.

In S240, it is checked whether the application is determined as restricted for execution on the user device 110. As noted above, according to an embodiment, S240 includes a check if the age group determined for the user is within the age bracket determined for the application. If so, execution continues with S250; otherwise, execution continues with S260.

In S250, the execution of the requested application is disabled by the server 130. According to one embodiment, the server does not open a communication link with the application's resources in order disable an execution for the user, and an error message is displayed to the user. According to one embodiment, upon determination that an application is restricted for execution on the user device 110 with respect of the user, a notification is sent to the user supervisor's device, e.g., the user's parent. In S260, the execution of the application is enabled on the user device 110 by the server 130, and execution continues with S270. In S270, it is checked whether there are additional requests and if so, execution continues with S210; otherwise, execution terminates.

The method is further described herein with a reference to an embodiment where the server 130 is configured to block any access to an application already displayed or otherwise installed on the wireless device. However, the disclosed method can be utilized to filter applications returned to the user as part of search results. The search may be in response to a user query or a designation of a folder in the user device. In this embodiment, S210 may be replaced with a request to determine if an application found through the search should be determined as a restricted application.

The various disclosed embodiments may be implemented as hardware, firmware, software, or any combination thereof. Moreover, the software is preferably implemented as an application program tangibly embodied on a program storage unit or non-transitory computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. All or some of the servers maybe combined into one or more integrated servers. Furthermore, a non-transitory computer readable medium is any computer readable medium except for a transitory propagating signal. The display segments and mini-display segments may be shown on a display area that can be a browser or another other appropriate graphical user interface of an internet mobile application, either generic or tailored for the purposes described in detail hereinabove. Furthermore, a non-transitory computer readable medium is any computer readable medium except for a transitory propagating signal.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for tracking and preventing an execution of an application on a user device communicatively connected to a remote server, comprising:
   receiving, by the remote server, a request to determine if the application is a restricted application for a user of the user device, wherein the request includes at least one context parameter respective of the application and at least one variable related to the user of the user device;
   analyzing, by the remote server, at least one context parameter respective of the application to determine an age bracket of the application, wherein at least one context parameter is identified based on a metadata of the application;
   analyzing, by the remote server, at least one variable related to the user of the user device to determine an age group of the user by correlating the at least one variable to at least a predefined set of rules, wherein a rule in the predefined set of rules defines at least any one of a behavior and an attribute observed for a certain age group;
   determining, by the remote server, whether the application is an age-restricted application for the user based on the analysis of the age bracket of the application and the age group of the user; and
   disabling, by the remote server, an access of the user by the user device to contents of the application, when the application is determined to be restricted.

2. The method of claim 1, further comprising:
   sending a notification of an attempt to execute the restricted application on the user device.

3. The method of claim 1, wherein the at least one variable is at least one of: a personal variable and an environmental variable.

4. The method of claim 3, wherein the personal variable includes at least one of: a user profile related to the user and demographic information related to the user.

5. The method of claim 3, wherein the at least one environmental variable includes at least one of: a search history, a time of day, a list of social friends as posted on a social web site, a location information, motion information, and weather information.

6. The method of claim 1, wherein the request to determine if the application is restricted is in response to any one of an execution request initiated by the user and a search request initiated by the user.

7. The method of claim 6, further comprising:
   filtering out the application from search results if the application is determined to be a restricted application.

8. A non-transitory computer readable medium having stored thereon instructions for causing one or more processing units to execute the method according to claim 1.

9. A remote server system for tracking and preventing an execution of an application on a user device, the system is remotely connected to the user device, comprising:
   an interface to a network to communicate with at least the user device over a network;
   a processor; and
   a memory coupled to the processor configured to store a plurality of instructions that when executed configure the system to:
   receive a request to determine if the application is a restricted application for a user of the user device, wherein the request includes at least one context parameter respective of the application and at least one variable related to the user of the user device;
   analyze at least one context parameter respective of the application to determine an age bracket of the application, wherein the at least one context parameter is identified based on a metadata of the application;
   analyze at least one variable related to the user of the user device to determine the age group of the user by correlating the at least one variable to at least a predefined set of rules, wherein a rule in the predefined set of rules defines at least any one of a behavior and an attribute observed for a certain age group;
   determine whether the application is an age-restricted application for the user based on the analysis of the age bracket of the application and the age group of the user; and
   disable an access of the user by the user device to contents of the application, when the application is determined to be restricted.

10. The system of claim 9, wherein the system is further configured to:
    send a notification of an attempt to execute the restricted application on the user device.

11. The system of claim 9, wherein the at least one variable is at least one of: a personal variable and an environmental variable.

12. The system of claim 11, wherein the personal variable includes at least one of: a user profile and demographic information related to the user.

13. The system of claim 11, wherein the at least environmental variable includes at least one of: search history, a time of day, a list of social friends as posted on a social web site, a location information, motion information, and weather information.

14. The system of claim 9, wherein the request to determine if the application is restricted is in response to any one of an execution request initiated by the user and a search request initiated by the user.

15. The system of claim 14, wherein the system is further configured to:
    filter out the application from search results if the application is determined to be a restricted application.

* * * * *